(No Model.)
J. H. LANAHAN.
DEVICE FOR SECURING FIXTURES TO MARBLE SLABS.
No. 597,503. Patented Jan. 18, 1898.
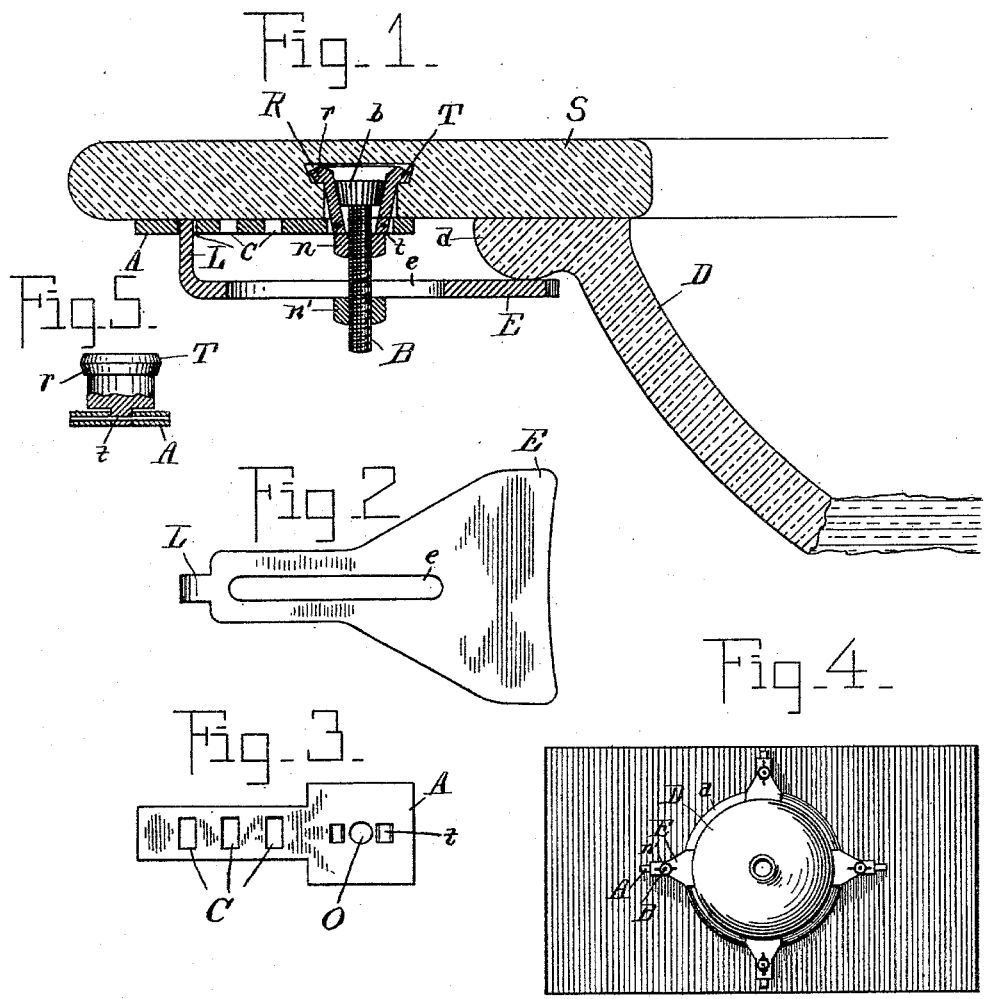

UNITED STATES PATENT OFFICE.

JAMES H. LANAHAN, OF AMSTERDAM, NEW YORK.

DEVICE FOR SECURING FIXTURES TO MARBLE SLABS.

SPECIFICATION forming part of Letters Patent No. 597,503, dated January 18, 1898.

Application filed August 20, 1897. Serial No. 648,979. (No model.)

*To all whom it may concern:*

Be it known that I, JAMES H. LANAHAN, a citizen of the United States, residing at Amsterdam, county of Montgomery, State of New York, have invented a new and useful Improvement in Plumbing Attachments, of which the following is a specification.

My invention relates to devices for securing to a marble slab any fixture or separate piece of work; and the object of my invention is to produce a device for securing to a marble slab a bowl, or any other fixture and to arrange an adjusting device in connection with the retaining mechanism by which the bowl or other fixture may be held and prevented from slipping from the position desired. I attain this object by means of the mechanism illustrated in the accompanying drawings, in which—

Figure 1 is a section. Fig. 2 is a view of the retaining-plate. Fig. 3 is a plan of the plate A. Fig. 4 is a view of a washbowl held in position, and Fig. 5 is a detail view of the thimble.

Similar letters refer to similar parts throughout the several views.

When it becomes necessary to secure to a marble slab or plate a bowl, a means for holding the bowl in contact with the plate requires some mode of preventing the bolt entering the hole drilled into the plate from being removed therefrom. This is commonly done by "leading" the bolt; but it often occurs that the leading becomes loose, shakes out, and unless the hole drilled into the slab is of the right size and the work of leading carefully and skillfully done the bowl is insecurely held and often becomes loosened. To do away with this objectionable feature, I have provided a device by means of which leading is unnecessary, which may be put into position very quickly, and which when placed in position cannot be removed by any jar or action upon the bowl or slab.

Into the slab S, I drill a hole which is larger in diameter at its greatest depth from the exterior of the slab, as at R, there being formed within the slab at the extent of the opening the rimmed opening R. Within the opening I place a thimble T, composed of two sections having a rim $r$ thereon, adapted to engage with and fit within the rimmed opening R. Each section of the thimble T is provided with a lug $t$, which is pivoted to the plate A, each section of the thimble having upon its pivot a motion to and from the other adapted to enable the thimble to be spread so that the rim $r$ shall engage with the sides of the opening R in the slab. I place a bolt B, having a head $b$, into the thimble through the opening O in the plate A. The head $b$ of the bolt B is adapted to cause the sections of the thimble T to be spread from each other in contact with the opening R in the slab. I usually place a nut $n$ on the shank of the bolt B, adapted to engage with the plate A. It is apparent that as the nut $n$ is screwed on the bolt B the head of the bolt will enter the thimble and cause the sections to be held securely and firmly in position within the opening in the slab. The greater the pressure exerted upon the head of the bolt the more tenacious will be its hold upon the slab. The plate A, I preferably arrange with a series of serrations or openings C.

To retain the bowl D or other fixture in position, I place a retaining-plate E in contact with the overlapping side $d$ and cause the bolt B to pass through the slotted opening $e$ in the plate E, and the lug L, projecting from said retaining-plate E, in contact with one of the openings or serrations C in the plate A, the nut $n$ engaging the bolt B with the retaining-plate E. Thus a bowl provided with a sufficient number of these retaining devices, as shown in Fig. 4, for instance, will be held firmly and positively in position.

It will be noticed that by means of the openings in the plate A, with which the lug on the retaining-plate E engages, the retaining-plate cannot possibly become disconnected from the overlapping edge of the bowl.

It is also noticeable that the apparatus is very simple in its construction, and that it may be very quickly placed in position, and that it is adjustable to the size of the overlapping edge of the bowl and the position of the hole in the slab.

What I claim as my invention, and desire to secure by Letters Patent, is—

1. In a device for securing a fixture to a marble slab, a thimble composed of two or more sections, a rim formed on said thimble and adapted to engage with a rimmed opening in a slab, a plate to which the sections of said thimble are pivoted, a retaining-plate adapted to engage with the bowl or fixture to be secured to the slab, a bolt passing through said thimble and said retaining-plate, a means for securing said bolt in contact with said retaining-plate, by the operation of which said bolt shall cause the sections of said thimble to separate and come in contact with the rimmed opening in the slab preventing the thimble from being removed from the slab, substantially as described and for the purpose set forth.

2. In a device for securing a fixture to a marble slab, a bifurcated thimble, a rim formed thereon, each section of said thimble pivoted to a plate, a bolt provided with a head placed through said thimble, the head in contact with the rimmed portion thereof, a retaining-plate adapted to engage with the bowl or fixture to be secured to the slab, a means for connecting said bolt to said retaining-plate, by the operation of which the sections of the thimble will become separated and held securely in position within the opening in the slab, and the retaining-plate held in contact with the bowl or fixture to be secured to the slab, substantially as described and for the purpose set forth.

3. In a device for securing a fixture to a marble slab, a sectional thimble, a rim or projection formed near one end of said thimble, a plate to which said thimble is pivoted, a bolt placed through said thimble, a means for operating said bolt, so that the sections of the thimble shall be forced outward from each other, substantially as described.

JAMES H. LANAHAN.

Witnesses:
H. V. BURKE,
FLORENCE J. SULLIVAN.